Figure 1:
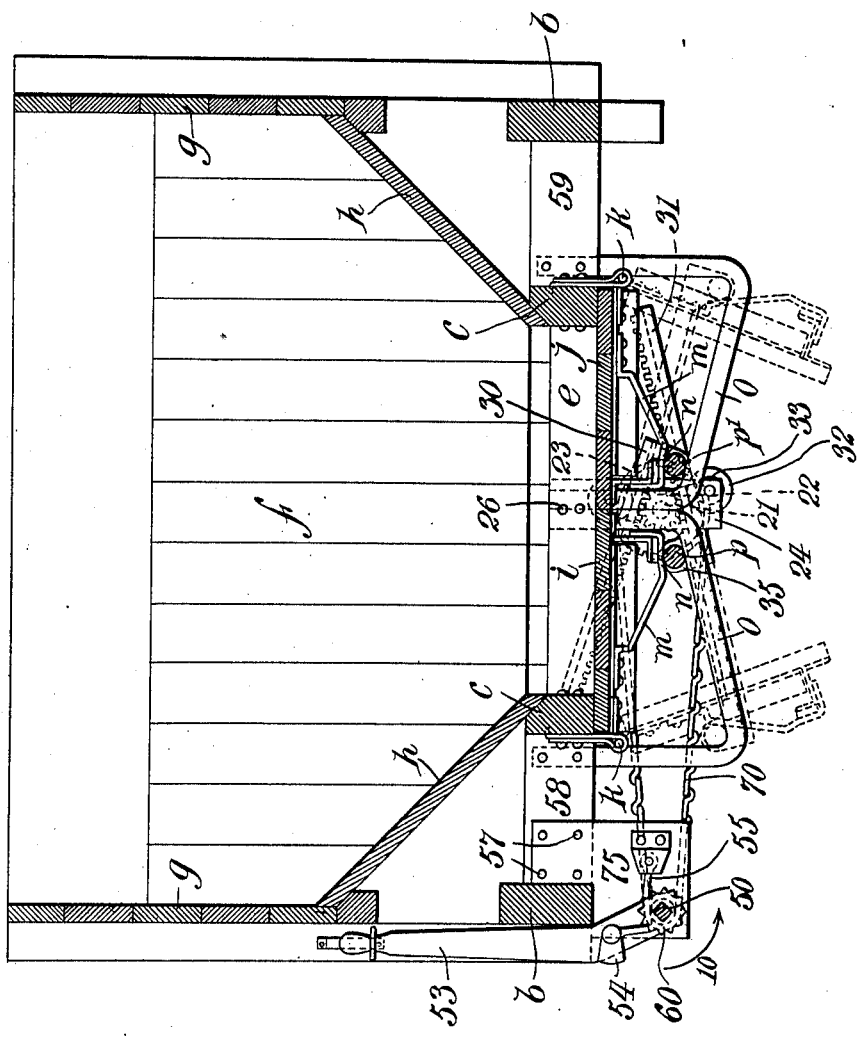

R. M. ZIMMERMAN.
DUMP CAR.
APPLICATION FILED JUNE 9, 1910.

1,021,287.

Patented Mar. 26, 1912.
3 SHEETS—SHEET 1.

Witnesses

Robert M. Zimmerman
Inventor
By Attorney

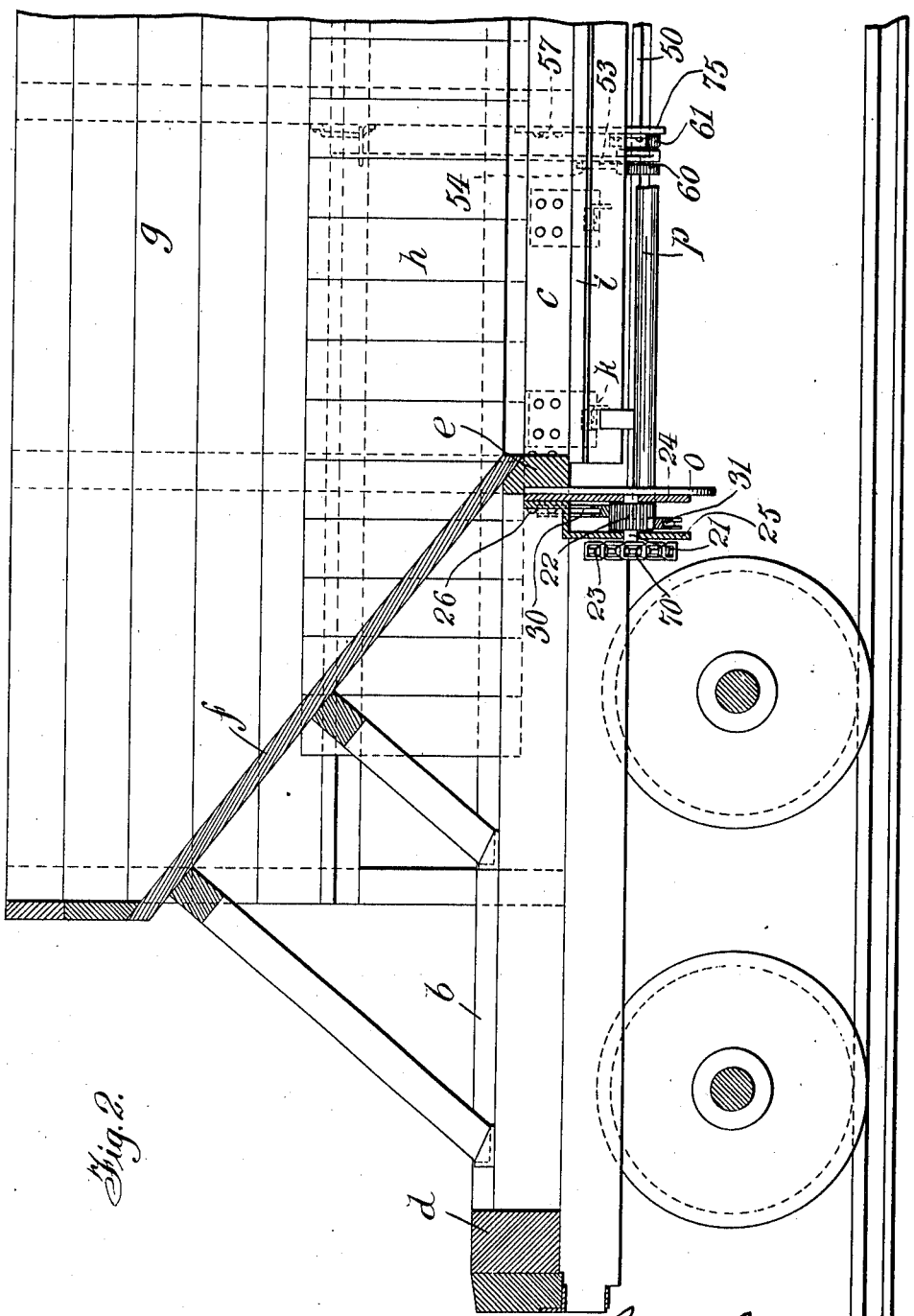

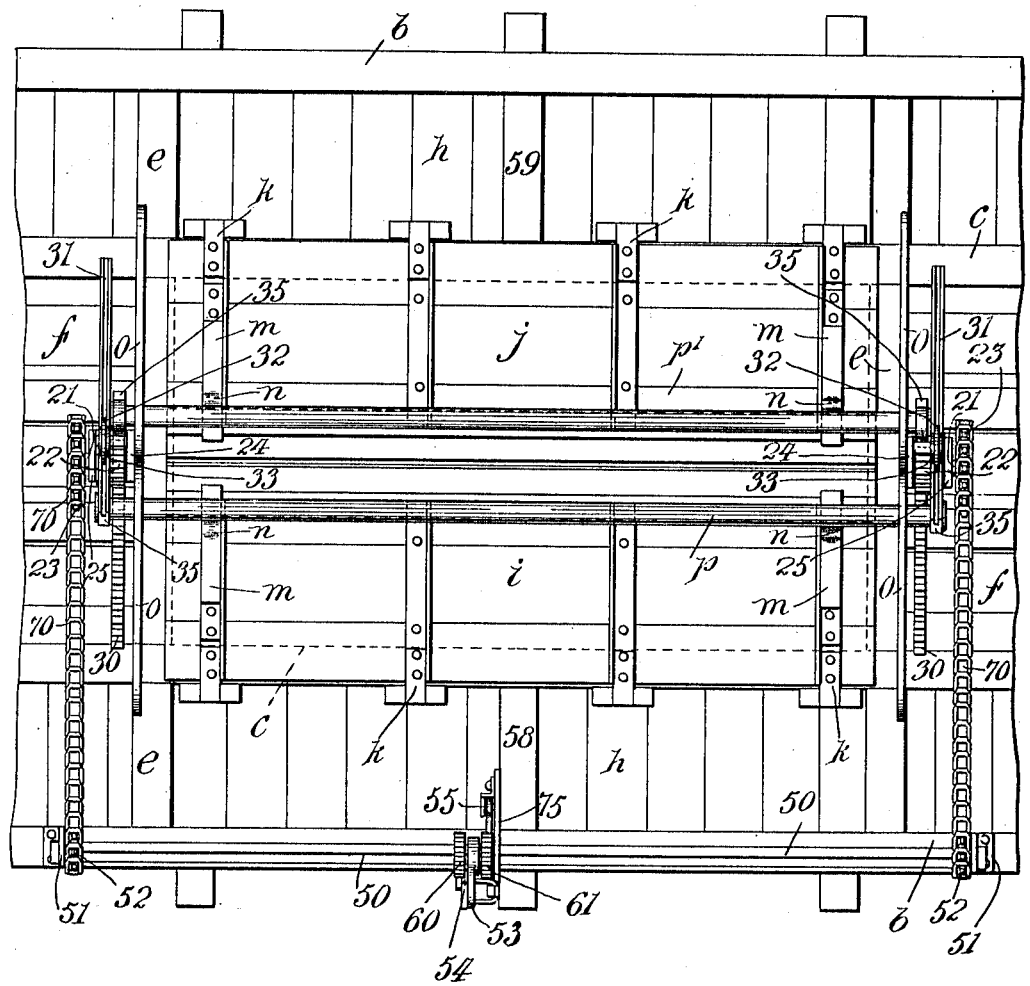

UNITED STATES PATENT OFFICE.

ROBERT MONTAGUE ZIMMERMAN, OF MONTREAL, QUEBEC, CANADA, ASSIGNOR TO NATIONAL DUMP CAR COMPANY, OF CHICAGO, ILLINOIS, A CORPORATION OF MAINE.

DUMP-CAR.

1,021,287. Specification of Letters Patent. Patented Mar. 26, 1912.

Application filed June 9, 1910. Serial No. 566,091.

*To all whom it may concern:*

Be it known that I, ROBERT MONTAGUE ZIMMERMAN, of the city of Montreal, Province of Quebec, Canada, have invented certain new and useful Improvements in Dump-Cars; and I do hereby declare that the following is a full, clear, and exact description of the same.

My invention relates to dump cars of the type having fixed bodies with discharge openings in the bottom and pairs of doors controlling the openings, and it has for its object to provide novel, and advantageous means for operating the doors from a unitary initial operating member.

The invention may be said to consist of the combination, construction and arrangement of parts herein described and pointed out in the claims. For full comprehension, however, of my invention, reference must be had to the accompanying drawings forming a part of this specification in which similar reference characters indicate the same parts and wherein:

Figure 1 is a transverse vertical sectional view of a car constructed according to my invention; Fig. 2 is a longitudinal vertical sectional view of one end of the car; and Fig. 3 is a plan view of the underside of the car, with the ends broken away.

The body of the car illustrated comprises a floor frame consisting of a pair of side sills $b$, longitudinal intermediate sills $c$, end sills $d$, and intermediate transverse sills $e$. The superstructure carried by this floor frame comprises inclined end hopper walls $f$ and side walls consisting of vertical and inclined portions $g$ and $h$ respectively, the transverse and longitudinal intermediate sills $e$ and $c$ having the hopper walls fastened thereto and forming the frame of the discharge opening of the car.

The doors $i$ and $j$, are hinged as at $k$ to the sills $c$ $c$ forming the sides of the discharge opening, and are provided on their underside with rails presenting tread surfaces $m$ $n$ the latter of which, when the doors are closed, converge slightly toward the supporting rails $o$ suspended from the floor framing. The doors are operated by laterally movable shafts $p$ $p'$ supported on the rails $o$, in conjunction with such rails, the rails on the underside of the doors and unitary gear operatively connected to both doors and comprising the following mechanism: From the centers of the transverse intermediate sills $e$ are suspended a pair of bearings in which are supported a pair of counter shafts 21, 21 each having a spur pinion 22 and a sprocket wheel 23 mounted rigidly thereon, the bearings each consisting of a flat bearing plate 24 and an angular bearing plate 25 fastened together and to the transverse intermediate sills by bolts 26, and having the counter shaft mounted in openings therein; the said bearings being located respectively at opposite sides of the sills, while the pinions are located between the bearing plates, and the sprocket wheels outside of the bearings. Two pairs of racks 30, 30, 31, 31, of U-cross-section intermesh with the tops and bottom sides of the pinions and are guided and retained against displacement from operative relation with the pinions by rollers carried by the plates 24 and 25 and formed with blades 32 and hubs 33 the blades engaging in the grooves between the flanges of the racks and preventing displacement of the racks in a direction parallel to the axes of the pinions, and the hubs bearing upon the edges of such flanges and preventing displacement of the racks in a radial direction. The racks of one pair are widened at one end as at 35 and mounted upon the ends of the shaft $p$, and the racks of the other pair are connected in a like manner to the shaft $p'$.

The counter shafts are operated by a main shaft 50 mounted in bearing plates 51, 51, suspended from the car frame and having mounted rigidly thereon near the ends sprocket wheels 52, 52 operatively connected to the sprocket wheels 23 by chains 70, while a pair of ratchet wheels 60 and 61 are mounted rigidly on the middle of the shaft the former being operated by a lever 53 fulcrumed on the shaft between the said ratchet wheels and carrying a pawl 54 engaging the ratchet wheel 60, a detent pawl 55, engaging the ratchet wheel 61 and being mounted on the bearing plate 75. This bearing plate 75 is bolted as at 57 to a short transverse sill 58 which with a corresponding sill 59, act as braces between the side and intermediate longitudinal sills, the bearing plates 51 being bolted to the underside of the side sills.

Operation: To raise the doors from open to closed positions the main shaft is rotated, by the lever, in the direction indicated by arrow 10 which causes the racks to move toward each other and the shafts $p$ and $p'$ to move correspondingly and, coacting with their supporting rails and the rails upon the doors, lift and close the doors, the shafts being stalled by the wedging thereof between the inclined portions $n$ of the rails on the doors and the supporting rails $o$. To open the doors the operating and detent pawls are thrown over thus releasing the ratchet wheels, and the lever operated in a reverse manner to formerly until the shafts $p$ and $p'$ are released from between the supporting rail and the rail upon the door when the weight of the load will precipitate the doors to full open position.

What I claim is as follows:

1. In a car, the combination with the underframe, and a pair of oppositely swinging hinged dumping doors, of a pair of reciprocating shafts each supporting one of the doors, a pair of sliding bars mounted in the said underframe and each connected to one of the said shafts, and unitary means for operating both bars simultaneously.

2. In a car, the combination with the underframe, and a pair of oppositely swinging hinged dumping doors, of a pair of reciprocating shafts each supporting one of the doors, a pair of toothed sliding bars mounted in the said underframe and each connected to one of the said shafts, a unitary rotatable device operatively engaging each of the toothed sliding bars, and means for rotating the said device.

3. In a car, the combination with the underframe, and a pair of oppositely swinging hinged dumping doors, of a pair of reciprocating shafts each supporting one of the doors in closed position and mounted in the underframe beneath the doors, a pair of parallel rigid sliding bars mounted in the said underframe and disposed in parallel planes, one end of each bar being connected to one of the said shafts and having their other ends free, and unitary means for operating both bars simultaneously.

4. In a car, the combination with the underframe, and a pair of oppositely swinging hinged dumping doors, of a pair of reciprocating shafts each supporting one of the doors in closed position and mounted in the underframe beneath the doors, a pair of parallel rigid toothed sliding bars mounted in the said underframe, one end of each bar being connected to one of the said shafts and having their other ends free, and a shaft extending longitudinally with relation to the car and mounted in the underframe thereof, pinions mounted rigidly upon the shaft and engaging the toothed racks, and means for rotating the last mentioned shaft for operating both bars simultaneously.

5. In a car, the combination with a pair of oppositely swinging doors, of a pair of reciprocating shafts adapted to operate the doors, a pair of sliding bars each connected at one end to one of the said shafts, and unitary means for operating both bars simultaneously, including a rotary member in operative relation with the sliding bars, a second rotary member rigidly connected to the first mentioned rotary member, a main shaft, means for operating the main shaft, and means operatively connecting the main shaft and second rotary member.

6. In a car, the combination with a pair of oppositely swinging doors, of a pair of reciprocating shafts adapted to operate the doors, a pair of sliding bars each connected at one end to one of the said shafts, and unitary means for operating both bars simultaneously, including a pinion, a countershaft, on which such pinion is mounted, a sprocket wheel on such shaft and in rigid relation with the pinion, a main shaft, a sprocket wheel rigid on the main shaft, a chain operatively connecting such sprocket wheels, and means for operating the main shaft.

7. In a hopper car having a pair of doors hinged at the sides of its discharge opening with their free edges meeting when the doors are closed, a pair of supporting rails below the level of the doors, rails upon the undersides of the doors, laterally movable shafts resting upon the supporting rails and having the doors supported thereon through the medium of the rails upon the doors, a main shaft located at one side of the car, bearings suspended from the car frame at opposite ends of the doors, counter shafts mounted in the bearing, means effecting operative connection between the main and counter shafts, spur pinions fixed upon the counter shaft, racks engaging the said pinions and connected to the laterally movable shafts, and means for rotating the said main shaft.

8. In a hopper car having a pair of doors hinged at the sides of its discharge opening with their free edges meeting when the doors are closed, a pair of supporting rails below the level of the doors, rails upon the undersides of the doors, laterally movable shafts resting upon the supporting rails and having the doors supported thereon through the medium of the rails upon the doors, a main shaft located at one side of the car, bearings suspended from the car frame at opposite ends of the doors, counter shafts mounted in the bearings, means effecting an operative connection between the main and counter shafts, spur pinions fixed upon the counter shaft, racks engaging the said pinions, rollers carried by the said bearings and preventing displacement of the racks from operative relation with the pinions, such racks being connected to the laterally movable shafts, and means for rotating the said main shaft.

9. In a hopper car having a pair of doors hinged at the sides of its discharge opening with their free edges meeting when the doors are closed, a pair of supporting rails below the level of the doors, rails upon the undersides of the doors, laterally movable shafts resting upon the supporting rails and having the doors supported thereon through the medium of the rails upon the doors, a main shaft located at one side of the car, bearings suspended from the car frame at opposite ends of the doors, counter shafts mounted in the bearings, an operative connection between the main and counter shafts, spur pinions fixed upon the counter shaft, racks of U-cross-section engaging the said pinions, rollers carried by the said bearings and preventing displacement of the racks from operative relation with the pinions, such rollers presenting hubs and circumferential blades, the blades engaging between the flanges of the U and the hubs bearing upon the edges of the said flanges, such racks being connected to the laterally movable shafts, and means for rotating the said main shaft.

10. In a car having a central discharge opening, a pair of doors hinged on opposite sides of and jointly closing the said opening, a pair of laterally movable shafts each adapted to operate one of the said doors, rack bars connected to the said shafts, the said rack bars being formed with parallel guides, means for operating the said rack bars, and rollers journaled on the car frame and engaging the said guides, for the purpose set forth.

In testimony whereof, I have signed my name to this specification, in the presence of two subscribing witnesses.

ROBERT MONTAGUE ZIMMERMAN.

Witnesses:
WILLIAM C. McFEAT,
FRED. J. SEARS.

---

Copies of this patent may be obtained for five cents each, by addressing the "Commissioner of Patents, Washington, D. C."